United States Patent [19]
Pavelle et al.

[11] 3,982,717
[45] Sept. 28, 1976

[54] HOLDER FOR TISSUE BOXES

[76] Inventors: Richard Pavelle, 3 Fieldstone Drive; Leon A. Ferber, 48 Lake Ave., both of Woburn, Mass. 01801

[22] Filed: Aug. 12, 1974

[21] Appl. No.: 496,804

[52] U.S. Cl. ............................ 248/313; 248/DIG. 5
[51] Int. Cl.² ...................................... F16M 13/02
[58] Field of Search ...... 248/313, 311, 309, DIG. 5, 248/316 B; 224/42.45 R, 42.1 G; 221/45; 211/31

[56] References Cited
UNITED STATES PATENTS

| | | | |
|---|---|---|---|
| 1,161,539 | 11/1915 | Siever | 211/31 |
| 2,043,620 | 6/1936 | Hoffman | 211/31 |
| 2,179,844 | 11/1939 | Erlanger et al. | 248/311 X |
| 2,256,204 | 9/1941 | Jameson | 248/DIG. 5 |
| 3,489,385 | 1/1970 | Dill | 248/311 |
| 3,591,120 | 7/1971 | Fietzer | 248/311 |
| 3,801,056 | 4/1974 | Brody | 248/311 X |
| 3,827,664 | 8/1974 | Larson | 248/311 |

*Primary Examiner*—J. Franklin Foss
*Attorney, Agent, or Firm*—Walter J. Kreske

[57] ABSTRACT

A spring holder which converts a box of tissues into a convenient, out-of-the-way storage and dispensing container particularly suitable for mounting in automobiles, the spring holder being characterized by a pair of spring legs adapted for anchoring at one end and at the other end having a support formation in cooperative relation to the spring legs and box for providing yieldable lift support to the tissue box against a reference surface, as well as resistance to lateral movement of the tissue box. In a first embodiment, each of the spring legs is of spring wire and has a spring loop distal from the anchor end and the support formation is comprised of an extension of each of the spring wire legs from the spring loop and having angular bends therein to engage a side, bottom and edge of an opening in the bottom of the tissue box. In a second embodiment, the support formation is comprised of an extension of each of the spring wire legs from the respective spring loop and having bends therein to engage two opposed ends and bottom of the tissue box, and an additional member fixed in transverse relation to the spring leg extensions for engaging the two sides of the box. In a third embodiment, the support formation is comprised of an extension of each of the spring wire legs from the spring loop and a tray fixed to the leg extensions and having a bottom and sides for engaging the bottom and respective sides of said tissue box. In a fourth embodiment, the pair of spring legs are of flat elastically resilient plastic and the support formation is comprised of an extension of the combined spring legs and having angular bends therein to engage a side, bottom and edge of an opening in the bottom of the tissue box.

1 Claim, 12 Drawing Figures

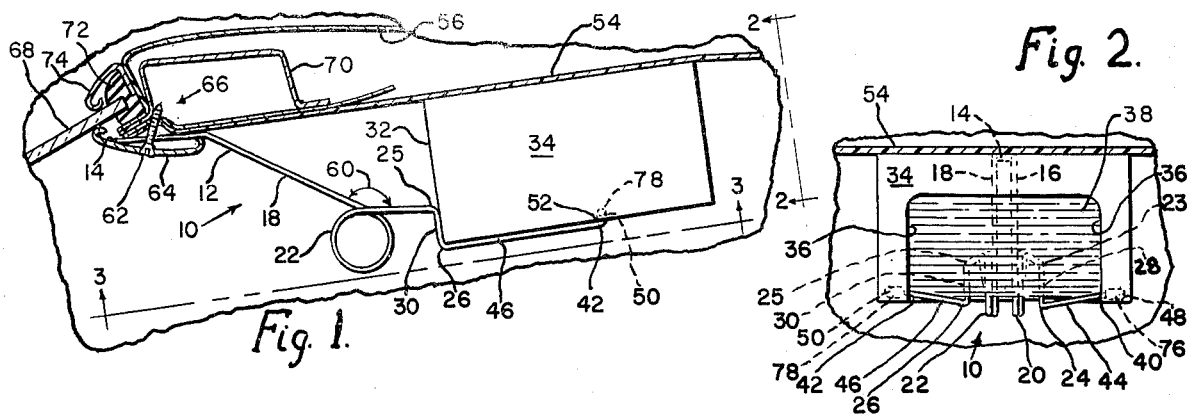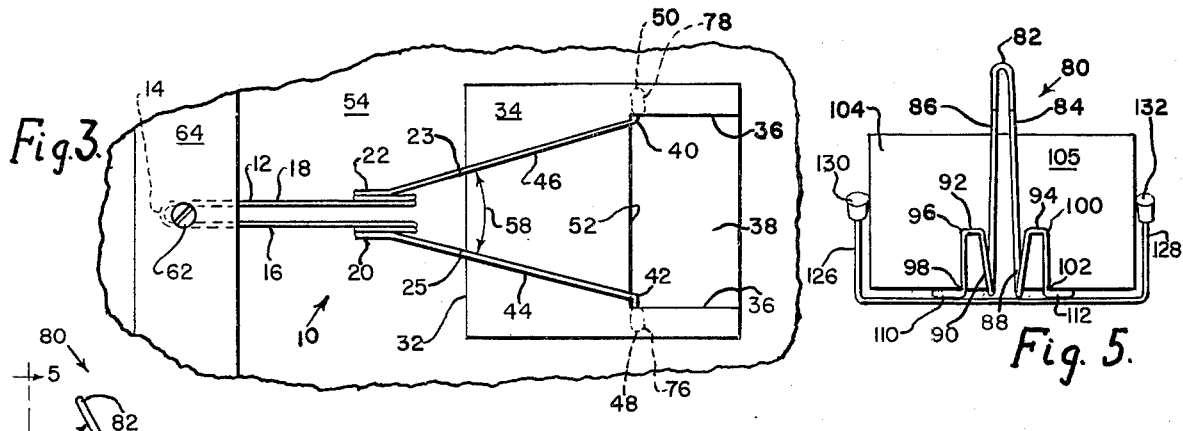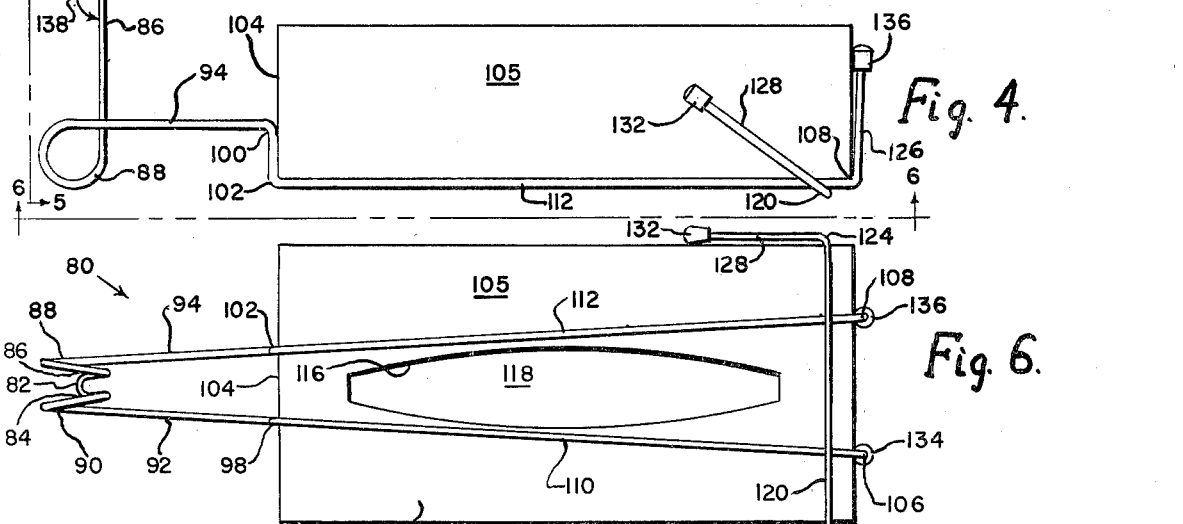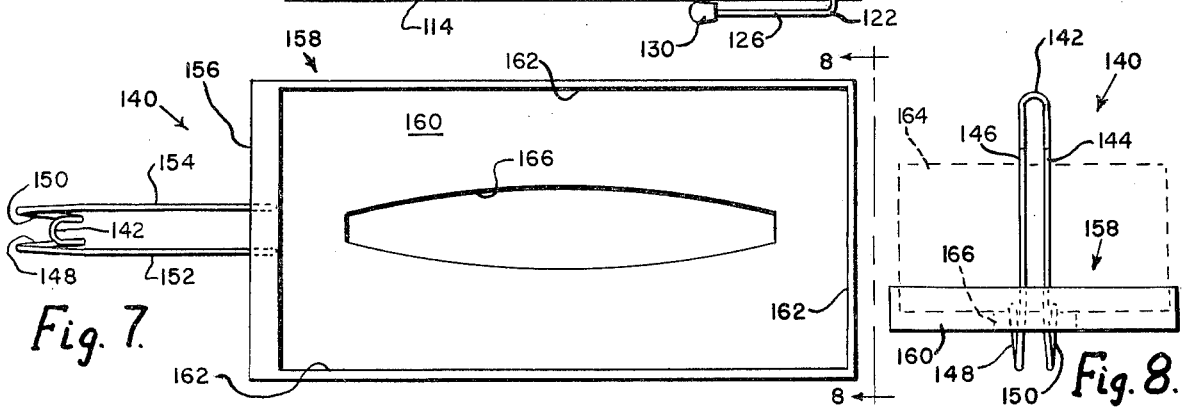

HOLDER FOR TISSUE BOXES

BACKGROUND OF THE INVENTION

This invention relates to holders for boxed tissues and more particularly to inexpensive spring holders for converting conventional tissue boxes into conveniently accessible, out-of-the-way tissue storage and dispensing containers particularly suitable for use in automobiles, pantries, closets and the like, and characterized by having at least one spring leg adapted for anchoring at one end and a support formation at the other end in cooperative relation to the spring leg and box for providing yieldable lift support to the tissue box against a reference surface as well as resistance to lateral movement of the tissue box. In some embodiments increased flexibility and convenience in use are achieved by providing a pair of spring wire legs adapted for anchoring at one end, a spring loop in each of the legs distal from the anchor end, and the support formation is in cooperative relation to the spring loops and box for providing yieldable support to the tissue box against a reference surface as well as resistance to lateral movement of the tissue box. By making the anchor end of the spring wire legs in the form of a substantially 360° reverse bend in the spring wire between the legs, anchoring inside an automobile between the interior molding and roof by an existing molding screw fastener at the top of the windshield and holding the tissue box in a conveniently accessible out-of-the-way position against the automobile headlining is thereby achieved.

For tissue boxes of the type having a tissue access opening extending from one end to a portion of one face of the tissue box, the support formation may be in the form of a pair of spring wire leg extensions extending from the spring loops and having angular bends to engage the box end opposite the access opening, and the face and the edge of the opening in the face of the tissue box, to thereby provide yieldable support to the tissue box against the headlining of the automobile, as well as resistance to lateral movement of the tissue box, along with an arrangement for easy replacement of an empty tissue box for replenishing tissue supply. Also for such tissue boxes, another embodiment of the invention is comprised of a pair of flat elastically resilient plastic legs adapted for anchoring at one end and the support formation is an extension of the combined legs and having angular bends to engage the box end opposite the access opening, and the face and the edge of the opening in the face of the box, and may carry a receptacle for convenience items beneath the tissue box holder.

For tissue boxes of the type having a tissue access opening in one face between the two ends and two sides of the box, the support formation is in the form of a wire leg extension extending from each of the spring loops, each leg extension having substantially right angle bends to engage the bottom and ends of the box, and a transverse member fixed to the leg extensions and having substantially right angle bends to engage the sides of the box to thereby provide the support and resistance to lateral movement of the box. An alternative structure is that of fixing a tray to the leg extensions near the spring loops, the tray having a bottom with an opening aligned with the tissue access opening in the tissue box face, and upwardly extending ends and sides on the tray for engaging the ends and sides of the tissue box for providing the lift support and resistance to lateral movement of the tissue box.

Boxed tissue carriers of the type disclosed in U.S. Pat. Nos. 2,460,906; 2,488,326 and 3,089,597 are inconvenient in that by their inherent construction they must be carried on a side panel of an automobile in a position which is not readily accessible to all of the passengers in the vehicle. Also, since they necessarily occupy space at the same level as that of the passengers, they create an undesirable obstruction to proper leg and hip room when a full complement of passengers occupy the vehicle.

Likewise, the tissue box carrier disclosed in U.S. Pat. No. 2,887,216 which is adapted for attachment to the glove compartment is not conveniently accessible to all passengers in the vehicle and creates an additional obstruction to passengers entering or leaving the vehicle at the side adjacent the glove compartment.

The visor rack disclosed in U.S. Pat. No. 3,019,908 does minimize obstruction to passengers, but has the disadvantage of requiring movement of the visor for access to its contents. Also if used for tissues, its capacity is only a fraction of that of a conventional tissue box.

The present invention constitutes a significant advance in the art in that Applicant's spring holder not only utilizes as a storage and dispensing container the conventional box in which the tissues are marketed, but also makes possible the positioning of the tissue box in a conveniently accessible position to all the passengers in the vehicle as well as at an out-of-the-way position which does not obstruct movement of any of the passengers.

Accordingly, it is a primary object of the present invention to provide a tissue box holder for converting a conventional tissue box into a conveniently accessible storage and dispensing container for the tissues in said box.

Another object is the provision of a tissue box holder which is particularly suitable for use in positioning a tissue box in an out-of-the-way position in an automobile so that it does not obstruct passenger occupancy or movement of passengers in the vehicle.

And another object is the provision of a tissue box holder particularly suitable for positioning the tissue box in an automobile in position conveniently accessible to all of the passengers.

A further object is the provision of a tissue box holder which is inherently structured for ease of tissue box installation and replacement.

Further objects include that of providing a tissue boox holder which is relatively inexpensive to manufacture, lends itself to mass production and is comprised of relatively few components, and lends itself to carry a receptacle for storing convenience items in addition to holding a tissue box in a convenient use position.

SUMMARY OF THE INVENTION

A tissue box holder in accordance with the present invention includes at least one spring leg adapted for anchoring at one end, and a support formation in cooperative relation to the spring leg and box for providing yieldable lift support to the tissue box against a reference surface and resistance to lateral movement of the tissue box. In one embodiment of the invention, the tissue box holder is comprised of a pair of spring wire legs with each leg having a spring loop distal from the anchor end and the support formation is comprised of an extension of each of the spring wire legs from the associated spring loop and having angular bends in each leg extension to engage a side, bottom and edge of an opening in a wall of the tissue box for thereby providing said lift support and resistance to lateral movement of said tissue box.

In a second embodiment, the support formation is comprised of an extension of each of the spring wire legs from the associated spring loop and having angular bends in each leg extension to engage two opposed sides and bottom of the tissue box, and an additional member fixed in transverse relation to the leg extensions for engaging the remaining two opposed sides of the tissue box for providing the lift support and resistance to lateral movement of the tissue box.

In a third embodiment of the invention, the support formation is comprised of an extension of each of the spring wire legs from the associated spring loop and a tray member fixed to the leg extensions and having a bottom and sides shaped to engage the bottom and sides of the tissue box to provide the support and resistance to lateral movement of the tissue box.

The adaptation for anchoring at one end of the spring wire legs in the above embodiments is provided by making both legs of a single spring wire having a reverse bend of substantially 360° at said end to facilitate clamping or otherwise anchoring said end to a convenient reference position.

In a fourth embodiment the tissue box holder is comprised of a pair of flat elastically resilient plastic legs adapted for anchoring at one end and the support formation is comprised of an extension of the combined spring legs and having angular bends in the extension to engage a side, bottom and edge of an opening in the bottom of the tissue box for providing the lift support against a reference surface and resistance to lateral movement of the tissue box. A convenience receptacle is fixed to the support formation to provide convenient storage for such items as tooth picks and pre-moistened towelettes.

DESCRIPTION OF THE DRAWINGS

The features of the invention which are believed to be novel are set forth with particularity in the appended claims. The invention, together with the features, objects and advantages thereof will be better understood from the following description in conjunction with the accompanying drawings in which like reference numbers identify like components, and in which:

FIG. 1 is a side view of a preferred embodiment of the invention shown anchored above an automobile windshield for holding a tissue box against the automobile headlining, only a cross section of a fragmentary portion of the automobile being shown;

FIG. 2 is an end view of the FIG. 1 embodiment taken on line 2—2 of FIG. 1;

FIG. 3 is a bottom view of the FIG. 1 embodiment taken on line 3—3 of FIG. 1;

FIG. 4 is a side view of a second embodiment of the invention with a tissue box shown therewith;

FIG. 5 is an end view of the FIG. 4 embodiment taken on line 5—5 of FIG. 4;

FIG. 6 is a bottom view of the FIG. 4 embodiment taken on line 6—6 of FIG. 4;

FIG. 7 is a plan view of a third embodiment of the invention;

FIG. 8 is an end view of the FIG. 7 embodiment taken on line 8—8 of FIG. 7 with a tissue box shown therewith.

DESCRIPTION OF THE ILLUSTRATED EMBODIMENTS

Figure 9:
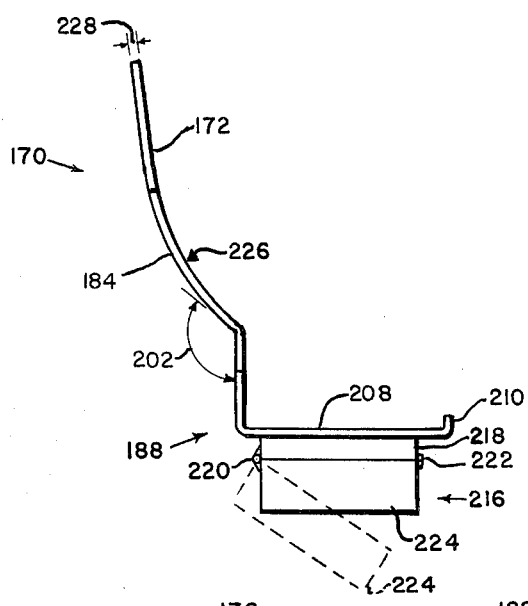
FIG. 9 is a side view of a fourth embodiment of the invention shown carrying a convenience receptacle at the bottom thereof.

A tissue box holder in accordance with the present invention is designated generally by the numeral 10 in FIGS. 1, 2 and 3. The tissue box holder 10 is comprised of a single spring wire 12 having a reverse bend 14 of substantially 360° to form an anchoring end of a pair of legs 16 and 18. The legs 16 and 18 each has formed therein spring loops 20 and 22 respectively a suitable distance from the anchor end 14. A short distance beyond the spring loops 20 and 22, extensions of the legs 16 and 18 each has a pair of vertical, substantially right angle bends 23, 24 and 25, 26 to form leg segments 28 and 30 which engage one side 32 of a tissue box 34, such for example as known commercially by the name of Scotties Family Hankies and having outside dimensions approximately 2⅜ ×4 ⅜ ×4 ⅝ inches and an opening 36 of a portion of the front and bottom walls or faces thereof for access to the tissues 38 contained therein. A lateral substantially right angle bend 40 and 42 at the other end of the extension of each of the legs 16 and 18 form with the bends 23 and 25 leg segments 44 and 46 of a length such that when the laterally extending ends 48 and 50 are inserted beneath the opposite edges of the opening 36 at the bottom face of the tissue box 34, they will engage the inner edge 52 (FIG. 3) so as to combine with the leg segments 28 and 30 to lock the tissue box 34 in place against a suitable cooperating surface 54 which in the exemplary embodiment is a headlining beneath the sheet metal roof 56 of a conventional automobile. Leg segments 44 and 46 extend at an angle greater than the angle 58 when not confined by the opposite edges of the tissue access openings 36. Thus when the laterally disposed leg ends 48 and 50 are inserted in the position shown in FIG. 3, the leg segments 44 and 46 will exert an outward pressure at the sides of the opening 36 to maintain themselves in place and resist lateral movement of the tissue box 34 such as when tissues 38 are being extracted therefrom.

Also the angle 60 formed by each of the legs 16 and 18 emanating from the spring loops 20 and 22 (FIG. 1) is substantially greater than exists if the tissue box holder 10 is in an unanchored no-load position. The spring wire 12 is selected of a size and the loops 20 and 22 of a diameter and number such that when the anchoring end 14 is fixed in place such as by an anchoring screw 62 between a conventional interior molding 64 and autoframe top structure 66 carrying the top edge of a conventional automobile windshield 68, the leg segments 28, 30 and 44, 46 respectively, together with laterally disposed leg ends 48 and 50 will provide upward support of the tissue box 34 against the headlining 54 and resistance to lateral movement of the tissue box 34.

It has been found that for the Scotties tissue box 34 described above, a 1/16 diameter spring wire, a 4½ inch leg segment from the anchor end 14 to the spring loops 20 and 22, two loops of 1 inch diameter for each of the spring loops 20 and 22, and leg segments from the spring loops to the laterally disposed leg ends 48 and 50 of 5½ inches and an angle 60 of approximately 90° when no load is on the tissue box holder 10 result in a suitably operative tissue box holder 10 with sufficient lift support and resistance to lateral movement of the tissue box 34 to hold it in place against the surface of the headlining 54 and as a storer and dispenser of tissues 38, and at the same time providing sufficient flexibility for ease in tissue box replacement when desired. However these dimensions are mentioned here for illustration only and not for limitation since other dimensions will be found suitable for specific applications of the invention.

The automobile structure 66 is similar in substantially all automobiles and includes an interior rigidizing hollow beam 70, rubber cushion 72 for the edge of the windshield 68, covered exteriorly by an exterior molding 74. It will be noted that the interior molding 64 is common to substantially all automobiles and commonly held in place by screws such as the screw 62 which may be temporarily removed for insertion of the anchoring end 14 of the tissue box holder 10 and thereafter replaced and tightened to effectively anchor the end 14 rigidly in place so that the spring wire legs 16 and 18 effectively supply yieldable support to the tissue box 34 against the headlining 54.

In the present instance each of the laterally disposed ends 48 and 50 are capped with a smooth cylindrical plastic bead to avoid injury to materials or personnel from sharp spring wire ends.

In operation for the removal of a tissue box 34, the leg segments 44 and 46 may be grasped between the thumb and forefinger of one hand and squeezed to reduce the angle 58 whereby the laterally disposed ends 48 and 50 will clear the opening 36 at the bottom face of the tissue box 34. Box 34 can then be easily withdrawn and, if desired, a new similar tissue box carrying a new supply of tissues 38 can be inserted in place, whereupon the legs segments 44 and 46 on being released will spring back into place with laterally disposed ends 48 and 50 positioned again as shown in FIG. 3.

A second embodiment of a tissue box holder in accordance with the present invention is illustrated in FIG. 4, 5 and 6 and designated generally by the numeral 80. The tissue box holder 80 has a reverse bend 82 of substantially 360° forming the anchor end of a pair of spring wire legs 84 and 86 each of which has a spring loop 88 and 90 respectively and leg extensions 92 and 94 emanating from the spring loops 88 and 90. Each of the leg extensions 92 and 94 have a pair of substantially right angle bends 96, 98 and 100, 102 to engage the side 104 of a tissue box 105 such for example as available commercially under the name of Kleenex and being approximately 4½ × 3¼ × 10 inches in outside dimensions which is more than twice the volume and weight capacity of the Scottie tissue box 34.

The configuration of the anchoring end 82, spring legs 84, 86, spring loops 88, 90, leg extensions 92, 94 with bends therein to engage side 104 of the tissue box 105 are substantially similar to the comparable portions of the tissue box holder 10 described above, except in that the diameter of the spring wire is substantially greater and a single loop appears in spring loops 88 and 90 for providing the increased strength and stiffness needed to accomodate the greater weight and leverage resulting from the increased size of the tissue box 105 over that of the tissue box 34. By way of example and not limitation, ⅛ inch diameter spring wire has been found suitable for the tissue box holder 80 to accomodate the above mentioned Kleenex tissue box and contents. Other sizes and dimensions may also be suitable for specific conditions.

The bends 98 and 102 together with substantially right angle bends 106 and 108 form leg segments 110 and 112 engaging the bottom wall or face 114 of the tissue box 105 to provide lift support thereto in manner similar to that described above in connection with spring leg segments 44 and 46. Spring leg segments 110 and 112 are separated a sufficient distance to straddle an opening 116 in the bottom face 114 for providing mannual access to tissues 118 stored in the tissue box 105.

A transverse spring wire member 120 is rigidly fixed as by welding or other suitable means to the spring leg segments 110 and 112 to hold them in place with sufficient separation to clear the opening 116 and provide added lateral rigidity to the tissue box holder 80. Transverse member 120 has substantially right angle bends 122 and 124 to form side support members 126 and 128, the ends of which have rubber caps 130 and 132 engaging the opposing sides of the tissue box 106 and which together with similar caps 134 and 136 on the ends of leg segments 110 and 112 engaging the end of the tissue box 105 provide resistance to lateral movement of the tissue box 105.

The anchor end 82 may be fastened in place at the top edge of a conventional automobile windshield in manner described above in connection with FIG. 1, in which event the tissue box 105 will be held against the headlining 54 at the roof of the automobile with access to the tissues 118 being through the opening 116.

The angle 138 in the legs 84 and 86 at the anchor end 82 (FIG. 4) is similar to that of tissue box holder 10 and is such that the anchor end portion 82 of the legs 84 and 86 will be in substantially the same plane as the surface of the headlining 54 against which the tissue box 105 will be held when the tissue box holder 80 is fixed in place in manner similar to the above described tissue box holder 10.

A third embodiment of tissue box holder in accordance with the present invention is illustrated in FIGS. 7 and 8 and is designated by the numeral 140. The tissue box holder 140 has a reverse bend 142 of substantially 360° forming the anchor end of a pair of spring wire legs 144 and 146, each of which has a spring loop 148 and 150 respectively and leg extensions 152 and 154 which terminate and are rigidly fixed in one end 156 of a support tray 158 having a bottom 160 and sides 162 which engage the bottom and sides of a tissue box which may be similar to the tissue box 105 with an end view shown by broken lines as tissue box 164 in FIG. 8.

The bottom 160 of the support tray 158 has an opening 166 which may be similar to the opening 116 in tissue box 105 and 164 to provide clearance for the corresponding opening in the bottom face of the tissue box 164 for manual access to tissues in the tissue box 164 in manner described in connection with the tissue box 105.

The configuration of the anchor end 142, spring legs 144 and 146, spring loops 148 and 150, spring leg extensions 152 and 154 may be substantially similar to the comparable portions of the tissue box holder 80. The tray 158 is preferably of a transparent or translucent plastic such as Plexiglas which lends itself to pleasing decorative coloring, but may also be of other suitable material such as wood or metal. The wall thickness of the tray 158 at the end 156 is greater than that of the remaining sides 162 to provide suitable strength for transmission of operating load to the ends of the spring leg extensions 152 and 154.

When the anchor end 142 is anchored in place such as at the top edge of a conventional automobile windshield in manner described above in connection with FIG. 1, the tissue box 164 will be held against the headlining 54 at the roof of the automobile with access to the tissues in the tissue box 164 being through the opening 166. The tissue box 164 may in such instance be conveniently replaced as needed by manually depressing the tray 158 against the yieldable upward support from the leg extensions 152 and 154 and lifting the tissue box 164 therefrom and inserting the replacement box thereon. A similar box replacement procedure is applicable to the tissue box holder 80.

A fourth embodiment of a tissue box holder in accordance with the present invention is illustrated in FIGS. 9 through 12 and is designated generally by the numeral 170. The tissue box holder 170 is preferably of an elastically resilient plastic material such as polypropylene which lends itself to being molded or formed as a unitary structure or alternatively blanked from flat sheet material and formed under stress and heat to the desired configuration in FIGS. 9 and 10 to be hereinafter described.

Figure 11:
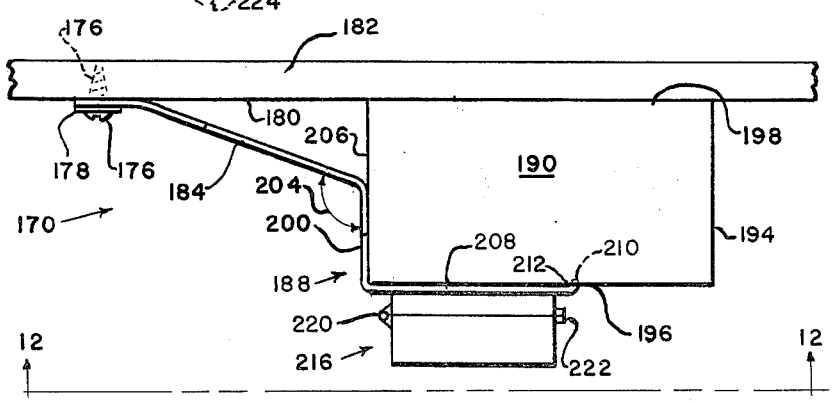
FIG. 11 is a side view of the FIG. 9 embodiment shown anchored in place and supporting a box of tissue against a reference surface.
Figure 12:
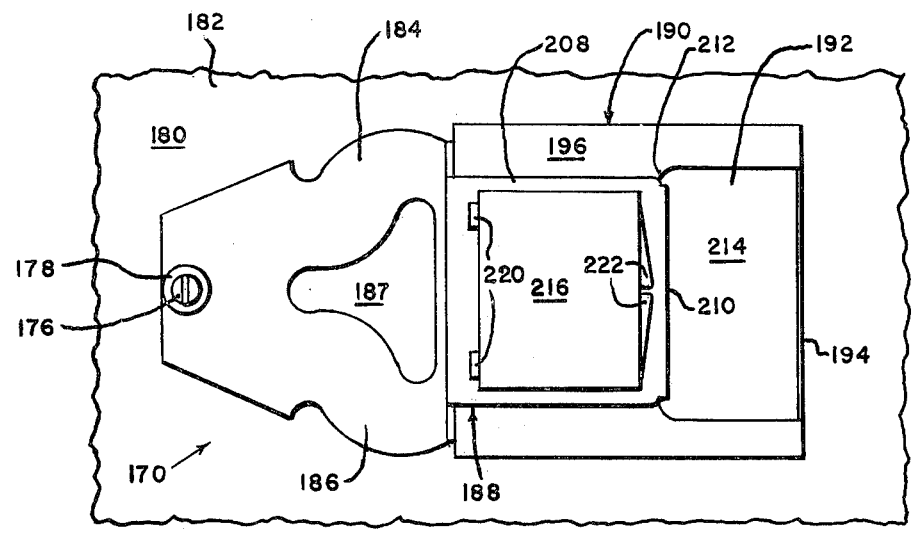
FIG. 12 is a view taken on line 12—12 of FIG. 11 to more clearly show construction, only a fragmentary portion of the reference surface being shown.

The tissue box holder 170 has a substantially flat anchor end formation 172 having a hole 174 for receiving a fastening device such as a screw 176 (FIGS. 11 & 12) and conventional washer 178 for fixing the anchor end formation 172 to a reference surface 180 such as the underside of a shelf 182, only a fragmentary portion of which is shown in FIGS. 11 and 12, or alternatively by the screw 62 (FIGS. 1 and 3) to the inside of an automobile in manner described in connection with the FIG. 1 embodiment.

Extending from the anchor end formation 172 are a pair of single leaf spring legs 184 and 186 about an opening 187 and which combine and terminate in a support formation 188 for a tissue box 190 which is similar to the tissue box 34. The tissue box 190 is of the type having a tissue access opening 192 extending from one end 194 and including a portion of the bottom face 196 of the tissue box 190. The support formation 188 has a flat stop formation 200 disposed at an angle 202 with respect to spring legs 184 and 186 when the tissue box holder 170 is unanchored as shown in FIG. 9 and at a smaller angle 204 when anchored in place as in FIG. 11. The stop formation 200 engages the end 206 which is opposite to the tissue access end 194 of the tissue box 190. The support formation 188 also has a bottom or support plate 208 disposed at substantially right angles to the stop formation 200 and which as shown in FIGS. 11 and 12 is for engaging the bottom face 196 of the tissue box 190 for providing lift support thereto so that the upper face 198 of the tissue box 190 is held firmly against the reference surface 180. The support plate 208 terminates in an upwardly disposed stop member or lip 210 which projects a small distance into the access opening 192 at its inner edge 212 so as to combine with the flat stop formation 200 to hold the tissue box 190 in place by providing substantial resistance to lateral movement of the tissue box, such as might occur when manually removing a tissue 214 from the tissue box 190.

As an added feature, a conventional receptacle or box 216 is fastened to the bottom of the support plate 208 by conventional means such as cementing or riveting the top of the cover 218 of the box 216 to the support plate 208. The cover 218 is held by conventional hinges 220 and friction clasps 222 to a bottom receptacle portion 224 in closed position shown in solid lines in FIGS. 9 through 12. This construction permits manual unlatching at the clasps 222 and swinging of the receptacle portion 224 to an open position as shown by the broken lines in FIG. 9 for access to stored convenience items therein such as tooth picks, pre-moistened towellettes and the like. Box 216 may be made of conventional materials such as plastic, metal, wood or paperboard.

The angle 202 (FIG. 9) and a curvature 226 in the spring legs 184 and 186 are empirically found to provide that when the tissue box holder 170 is anchored in place by screw 176 so as to hold the tissue box 190 firmly in place against the reference surface 180, the legs 184 and 186 will preferably be flexed to lie in an approximately flat plane with a decrease in the angle 204 over that of the angle 202 in the unstressed position of FIG. 9. Thereby, a yieldable upward pressure will be maintained by the support formation 208 against the bottom face 196 of the tissue box 190 so as to yieldably hold the box 190 with its upper face 198 firmly against the reference surface 180. It has been found that for a tissue box 190 or 34, suitable holding support pressure and strength may be obtained in a tissue box holder 170 having a thickness 228 (FIGS. 9 & 10) of 1/16 inches, the anchoring formation 172 having a length 230 of 1 and ¾ inches and widths 232 and 234 of 2 and 3¼ inches respectively, spring legs 184 and 186 each having a length 236 of 1½ inches and widths 238 and 240 of 13/16 and 1 1⅛ inches respectively and a curvature 226 of about 3⅛ inches radius, and an angle 202 of about 135°. While a tissue box holder having the above dimensions will provide the desired yieldable upward support and lateral resistance to movement of the box 190 for holding it in place against the reference surface 180 without internally overstressing the respective portions of the holder 170, such as the spring legs 184, 186, anchoring formation 172 or portions of the support formation 188, this exemplary dimensioning of structure is cited here by way of example and not limitation and with the understanding that other dimensions and holding support pressures and resistance to lateral movement of the tissue box 190 may may also be suitably used.

Figure 10:
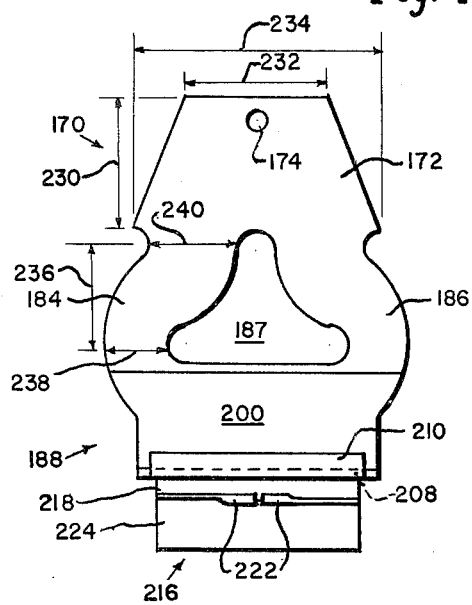
FIG. 10 is a front elevation of the FIG. 9 embodiment.

Also, while the legs 184 and 186 are shown in FIGS. 10 and 12 to have lateral curvatures therein, which curvatures are found by their lateral spread to provide desirable lateral stability for holding tissue box 190, as well as an aesthetic quality for enhancing appearance, it should be noted that the spring legs 184 and 186 can be combined to form a single leg for performing the yieldable spring function of the two legs 184 and 186.

In the operation for the removal of a tissue box 190, the support plate 208 may be deflected downwardly by pushing downwardly on the legs 184 and 186 at the back end 206 of the tissue box 190 (FIG. 11) so as to deflect the stop member 210 to clear the bottom face 196 of the tissue box 190, whereby the tissue box 190 may be manually removed and a new similar tissue box with a new supply of tissues therein conveniently inserted. Thereupon, release of downward pressure on the legs 184 and 186 again permits the support plate 208 to rise and stop member 210 to engage the inner edge 212 of tissue access opening 192 to hold the new tissue box in place against the reference surface 180 and provide resistance to lateral movement of the new tissue box as explained above in connection with tissue box 190.

It will be noted that while the embodiments herein shown and described in connection with FIGS. 1 through 8 are particularly applicable to mounting at the roof of an automobile for convenient storage and access to all passengers in the automobile, they are also suitable for use as a convenient storage and dispensing structure in other locations. For example, they may be used with a shelf in a closet or pantry as described in connection with FIGS. 11 and 12, in which event the screw 62 and molding 64 are replaced by screw 176 and washer 178 to provide a suitable fastener for anchoring any of the anchor ends 14, 82 or 142 to the underside of said shelf.

This invention is not limited to the specific details of construction and operation described herein as equivalents will suggest themselves to those skilled in the art.

What is claimed is:

1. In a spring wire device for holding a box of tissue in place against a reference surface, the tissue box being of the type having a tissue access opening on the bottom face of said box between two opposed ends and opposed sides of said box wherein said tissue box has a length dimension between said opposed ends substantially greater than its width dimension between said opposed sides and said tissue access opening on said bottom face has a length dimension between said opposed ends greater than its width dimension between said opposed sides, the combination of an anchoring formation comprised of a substantially 360° bend in a single spring wire forming a bifurcation with an opening sufficient to receive a fastening member therethrough for anchoring said holding device in place, said wire extending from said 360° anchoring formation bend in the form of two spring legs with each leg having a spring loop distal from the anchoring formation, a spring leg extension from each spring loop followed by a pair of substantially right angle bends in the spring wire of each of said legs to form a stop formation in each of said leg extensions for engagement with one of said box ends, a further leg extension extending from each of said stop formations for supplying lift support at said tissue box face, a further stop formation in each of said further leg extensions being comprised of a substanitally right angle bend in each of said further leg extensions for engaging the other said box ends, and a transvers member fixed to said further leg extensions to firmly hold said further leg extensions a fixed distance from each other on respective sides of said tissue access opening and having upwardly directed end extensions with each end extension at a substantially right angle to said transverse member for engaging said box sides to provide with the other stop formations resistance to lateral movement of said box.

* * * * *